United States Patent [11] 3,613,110

[72] Inventors T. O. Paine
Administrator of the National Aeronautics and Space Administration in respect to an invention of;
Russell K. Caplette, San Gabriel, Calif.

[21] Appl. No. 850,587
[22] Filed Aug. 15, 1969
[45] Patented Oct. 12, 1971

[54] CURRENT STEERING COMMUTATOR
8 Claims, 3 Drawing Figs.

[52] U.S. Cl. 340/174 SR, 340/174 CS, 340/174 LC, 340/174 M
[51] Int. Cl. G11c 21/00, G11c 11/06
[50] Field of Search 340/174 SR, 174 LC, 174 CS

[56] References Cited
UNITED STATES PATENTS
2,955,264 10/1960 Kihn et al. 340/174

*Primary Examiner*—James W. Moffitt
*Attorneys*—J. H. Warden, Paul F. McCaul and G. T. McCoy

ABSTRACT: A commutator for steering a controlled current successively through a plurality of loads. The commutator employs a two-phase magnetic core shift register comprised of a number of stages, each stage including a transmit core and a receive core. The plurality of loads equal in number the sum of the transmit and receive cores where unidirectional load currents are required. Where bidirectional load currents are required, a transmit core and a receive core are dedicated to each load. The cores are interconnected so as to shift a binary "1" (set state) from a stage transmit core to the receive core of the same stage during a first phase and then to the transmit core of the following stage during a second phase. Core drive pulses are alternately applied to all of the transmit and receive cores. The transmit core drive pulse, for example, switches all of the transmit cores to a "1" state except that transmit core already in the "1" state. The switching transmit cores develop an output pulse to back-bias diodes coupled to their loads so that a controlled current pulse applied to all of the diodes will be steered through the diode and load coupled to the nonswitching transmit core. The transmit core drive pulse applied to the nonswitching transmit core will also switch the receive core of the same stage to a "1" state.

INVENTOR
RUSSELL K. CAPLETTE
BY J. H. Warden
[signature]
ATTORNEYS

INVENTOR
RUSSELL K. CAPLETTE
BY J. H. Warden
[signature]
ATTORNEYS

CURRENT STEERING COMMUTATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates generally to electronic commutators, and more particularly, to a commutator useful for steering a controlled current successively through a plurality of loads.

2. Description of the Prior Art

The prior art is replete with various commutator implementations all intended to steer current through successive loads. Although such implementations function satisfactorily in many applications, their design has been such as to make it extremely difficult to steer a precisely controlled current to the loads. Rather, it is characteristic of some prior art commutators that the amplitude and voltage of currents steered to the loads are somewhat variable and inexact. This characteristic, at least in some prior art implementations, results in part from the fact that the load current is not merely steered to the loads, but is also used, for example, to cause switching to establish a subsequent current path. Although many applications can well tolerate this variability and inexactness, certain applications, for example, in space systems, require that the load currents be more precise.

OBJECTS AND SUMMARY OF THE INVENTION

In view of the foregoing, it is an object of the present invention to provide a commutator capable of steering precisely controlled currents successively through a plurality of loads.

It is a more particular object of the present invention to provide a commutator capable of steering precisely controlled bidirectional currents successively through a plurality of loads.

Briefly, in accordance with the present invention, a two-phase magnetic core shift register is employed comprised of a plurality of stages, each including a transmit core and a receive core. The stages are interconnected so that during a first or A phase, a "1" uniquely stored in one of the transmit cores is shifted to the receive core of the same stage. During a second or B phase, a "1" uniquely stored in one of the receive cores is shifted to the transmit core of a succeeding stage. Transfer of the "1" from the transmit core to the receive core is effected in response to an A phase drive current pulse applied to all of the transmit cores tending to switch them all to a "1" state. All of the transmit cores other than that previously storing a "1" will switch and in so doing couple back-biasing signals to diodes coupled thereto. The A phase drive current pulse will not switch the transmit core previously storing a "1" and thus the diode coupled thereto will not be back-biased. Consequently, when a precisely controlled current is coupled to all of the diodes, it will be completely steered through the one diode which is not back-biased. The A phase drive current pulse applied to the nonswitching transmit core will switch the receive core of the same stage to a "1" state.

In a first embodiment of the invention for providing unidirectional load currents, the commutator shift register requires a total of transmit and receive cores equal in number to the number of loads to be driven. Each load is coupled through a diode to a different one of the shift register cores. In an alternate embodiment of the invention, useful for example for driving bidirectional currents through select lines of a core memory, the transmit core of a shift register stage is connected so as to permit current flow in one direction through a load while the receive core of the same stage is connected so as to permit current flow in an opposite direction through the load.

DESCRIPTION OF THE PREFERRED EMBODIMENTS

Figure 1:
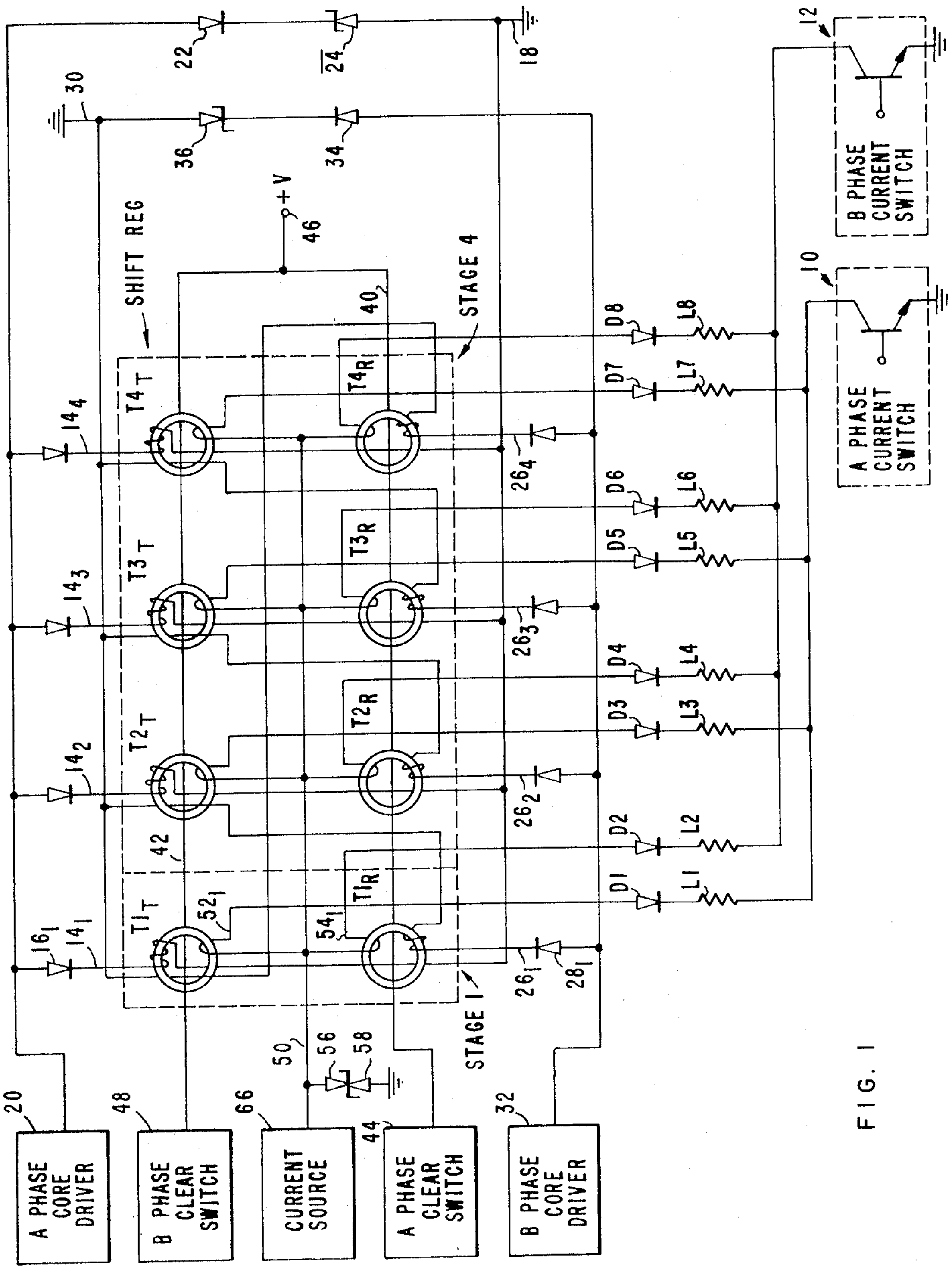
FIG. 1 is a schematic block diagram illustrating a first embodiment of the invention for supplying unidirectional load currents.

Attention is now called to FIG. 1 of the drawing which illustrates a first embodiment of the invention for applying unidirectional load currents successively to each of a plurality of load devices L1–L8. Each of the loads L1–L8 is connected to the cathode of a different one of diodes D1–D8. As shown in FIG. 1, the lower end of each of loads L1, L3, L5 and L7 is connected to the collector of an A phase transistor current switch 10. The lower end of each of loads L2, L4, L6 and L8 is connected to the collector of a B phase transistor current switch 12. The emitters of transistor switches 10 and 12 are grounded. The bases of transistor switches 10 and 12 are controlled, as will be described hereinafter, to cause the loads to successively conduct controlled unidirectional currents therethrough.

The system of FIG. 1 employs a two-phase magnetic core shift register which, in accordance with the invention, can be comprised of any number of stages. The exemplary embodiment illustrated in FIG. 1 employs four stages, each stage comprised of a first or transmit core and a second or receive core.

More particularly, as shown in FIG. 1, a first magnetic core shift register stage is comprised of a transmit core $T1_T$ and a receive core $T1_R$. Similarly, illustrated stages 2, 3 and 4 are comprised of transmit and receive cores. As will be seen hereinafter, the cores are interconnected so that the state of a transmit core of a particular stage can be transferred to the receive core of the same stage during a first or A phase and the state of a receive core can be transferred to the transmit core of the succeeding stage during a second or B phase. Inasmuch as all of the magnetic core shift register stages are substantially identical, reference will be primarily made to exemplary stage 1, but it will be understood that the remarks will for the most part apply to all of the stages.

An A phase drive winding $14_1$ is threaded from the cathode of diode $16_1$ through the cores $T1_T$ and $T1_R$ to a ground terminal at 18. The output of an A phase core driver 20 is connected to the anode of diode $16_1$. When actuated, the core driver 20 will provide a current through the diode $16_1$ in a direction tending to switch the cores $T1_T$ and $T1_R$ to a "1" or set state in which the flux orientation is in a clockwise direction when observed in FIG. 1. Note that drive windings $14_2$, $14_3$ and $14_4$ all similarly thread the transmit and receive cores of stages 2, 3 and 4 of the magnetic core shift register of FIG. 1. Diode 22 and Zener diode 24 are connected in series, between the output of the core driver 20 and the ground terminal 18 for precisely controlling the maximum potential applied across the A phase drive windings 14.

A plurality of B phase drive windings $26_1$ to $16_4$ couple the receive core of each of the shift register stages to the transmit core of a subsequent stage. For example, second phase drive winding $26_1$ is threaded through receive core $T1_R$ and transmit core $T2_T$. The winding $26_1$ is connected between the cathode of diode $28_1$ and ground terminal 30. A B phase core driver 32 is connected to the anode of diode $28_1$ and to the anodes of each of the diodes connected to the other B phase drive windings. As with the A phase drive windings, a voltage regulating means in the form of a diode 34 and Zener diode 36 is connected between the output of the B phase core driver 32 and ground terminal 30.

In addition to the aforementioned A phase and B phase drive windings 14 and 26, A phase clear and B phase clear windings 40 and 42 are also provided. More particularly, the A phase clear winding 40 threads through all of the receive cores and is connected between an A phase clear switch 44 and a positive potential terminal 46. The B phase clear winding 42 threads through all of the transmit cores and is connected between a B phase clear switch 48 and the positive potential terminal 46.

In addition to the foregoing, a plurality of different load windings are provided, each threaded through a different one of the shift register cores and each connected between a current bus 50 and the anode of a different one of the diodes D1–D8. For example, load winding $52_1$ is threaded through core $T1_T$ and is connected between bus 50 and diode D1. Load winding $54_1$ is threaded through core $T1_R$ and is connected between current bus 50 and diode D2. A voltage regulating means comprised of diode 56 and Zener diode 58 connect current bus 50 to ground.

Figure 2:
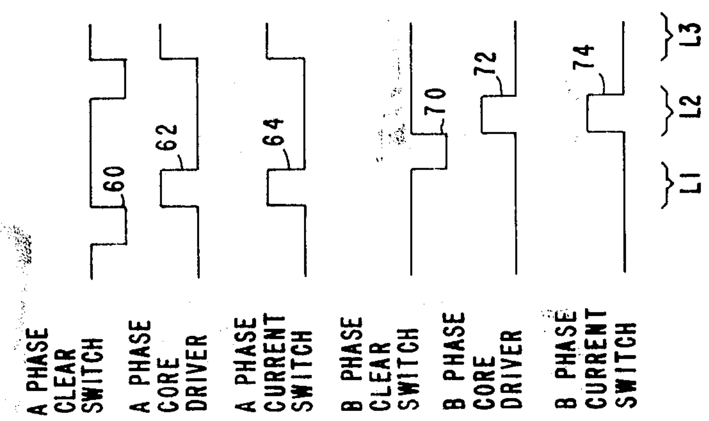
FIG. 2 is a waveform diagram illustrated to facilitate an understanding of the system of FIG. 1.

In the operation of the embodiment of FIG. 1, assume that "1" (set state) is uniquely stored in transmit core $T1_T$. As previously pointed out, this means that the magnetic orientation in core $T1_T$ will be in a clockwise direction. All of the other transmit cores will be reset meaning that the magnetic orientation therein is in a counterclockwise direction. As shown in FIG. 2, the A phase clear switch 44 first generates a pulse 60 which will switch all of the receive cores to a reset state. After all of the receive cores have been reset, the A phase core driver 20 will apply a positive pulse 62 to all of the first phase drive windings $14_1$–$14_4$. The affect of this A phase drive pulse 62 is to switch the transmit cores in a reset state to the set state. Thus, on the basis of the prior assumption that all of the transmit cores other than core $T1_T$ were in the reset state, cores $T2_T$, $T3_T$, and $T4_T$ will switch to a set state. In so doing, they will induce a pulse on the load windings respectively threaded therethrough which back-biases the load diodes D3, D5 and D7 coupled thereto. The first phase drive pulse 62 applied to winding $14_1$ will not, however, switch core $T1_T$ inasmuch as it previously was in a set state and thus diode D1 will not be back-biased. Accordingly, if the A phase current switch 10 is turned on, as represented by pulse 64 in FIG. 2, then a current from the source 66 will be passed through the bus 50, load winding $52_1$ of core $T1_T$, and then through diode D1 and load $L_1$. In other words, the current provided by the source 66 will be fully steered through the only one of the load diodes not back-biased coupled to the A phase current switch 10.

It is significant to note that a greater number of A phase drive winding turns thread the transmit cores than the receive cores. This is done in order to assure that when an A phase drive pulse switches a transmit core, it will not also switch the receive core of the same stage. That is, as a consequence of having a greater number of turns, the transmit core will start to switch prior to the corresponding receive core and the switching will induce an opposite polarity signal in the phase drive winding to thus prevent the receive core from switching.

In addition to back-biasing certain ones of the load diodes to execute current steering, the A phase drive pulse 62 functions to shift the "1" (set state) from the nonswitching transmit core $T1_T$ to the receive core $T1_R$. In order to understand why this occurs, consider initially the action in one of the stages containing a transmit core which switches in response to the A phase drive pulse. Considering stage 2 for example, the transmit core $T2_T$ will in response to the A phase drive pulse applied to winding $14_2$ start to switch to a set state. Because winding $14_2$ has two turns around core $T2_T$ and only one turn around core $T2_R$, the switching rate will be significantly greater in core $T2_T$. As a consequence of the switching in core $T2_T$, an opposite polarity signal will be induced in the turns of windings $14_2$ which will thus prevent the switching of the core $T2_R$. In other words, as a consequence of utilizing a greater number of turns on the transmit cores than the receive cores, a pulse applied to the A phase drive windings, can switch the transmit cores to a set state without affecting the receive cores of the same stages. On the other hand, in the case of stage 1 wherein it has been assumed that the core $T1_T$ is in a set state prior to the A phase drive pulse, no switching will occur in the core $T1_T$, and no opposite polarity signal will be induced in winding $14_1$. Thus, the A phase drive pulse applied to winding $14_1$ will switch core $T1_R$ to a set state. Thus, "1" stored in core $T1_T$ will be transferred to core $T1_R$ by the first phase drive pulse 62.

Subsequently, all of the transmit cores are cleared to a reset state by the B phase clear switch 48 providing the B phase clear pulse 70 illustrated in FIG. 2. The B phase drive pulse 72 is then applied by driver 32 to all of the windings 26. Inasmuch as all of the receive cores of stages 2, 3 and 4 are in their reset state, they will all switch to their set states and in so doing back-bias diodes D4, D6 and D8 respectively. Core $T1_R$ which was previously in the set state will not switch and therefore diode D2 will not be back-biased. Thus, when the current switch 12 is then closed as represented by pulse 74 in FIG. 2, the controlled current pulse from source 66 will be steered through diode D2 and load L2.

Inasmuch as the core $T1_R$ does not switch in response to the pulse 72 applied to the B phase drive winding $26_1$, the core $T2_T$ will switch to a set state.

Thus, from the foregoing explanation of the embodiment of FIG. 1, it will be recognized that the A phase and B phase drive pulses are alternately applied to the A phase and B phase drive windings and as a consequence a single "1" will be shifted through the cores of the shift register. During each phase, only one of the cores will contain a "1" and it will be this core only that will not provide a back-biasing signal to the load diode coupled thereto. Accordingly, all of the current provided by the source 66 will be steered through that diode and the load coupled thereto.

Figure 3:
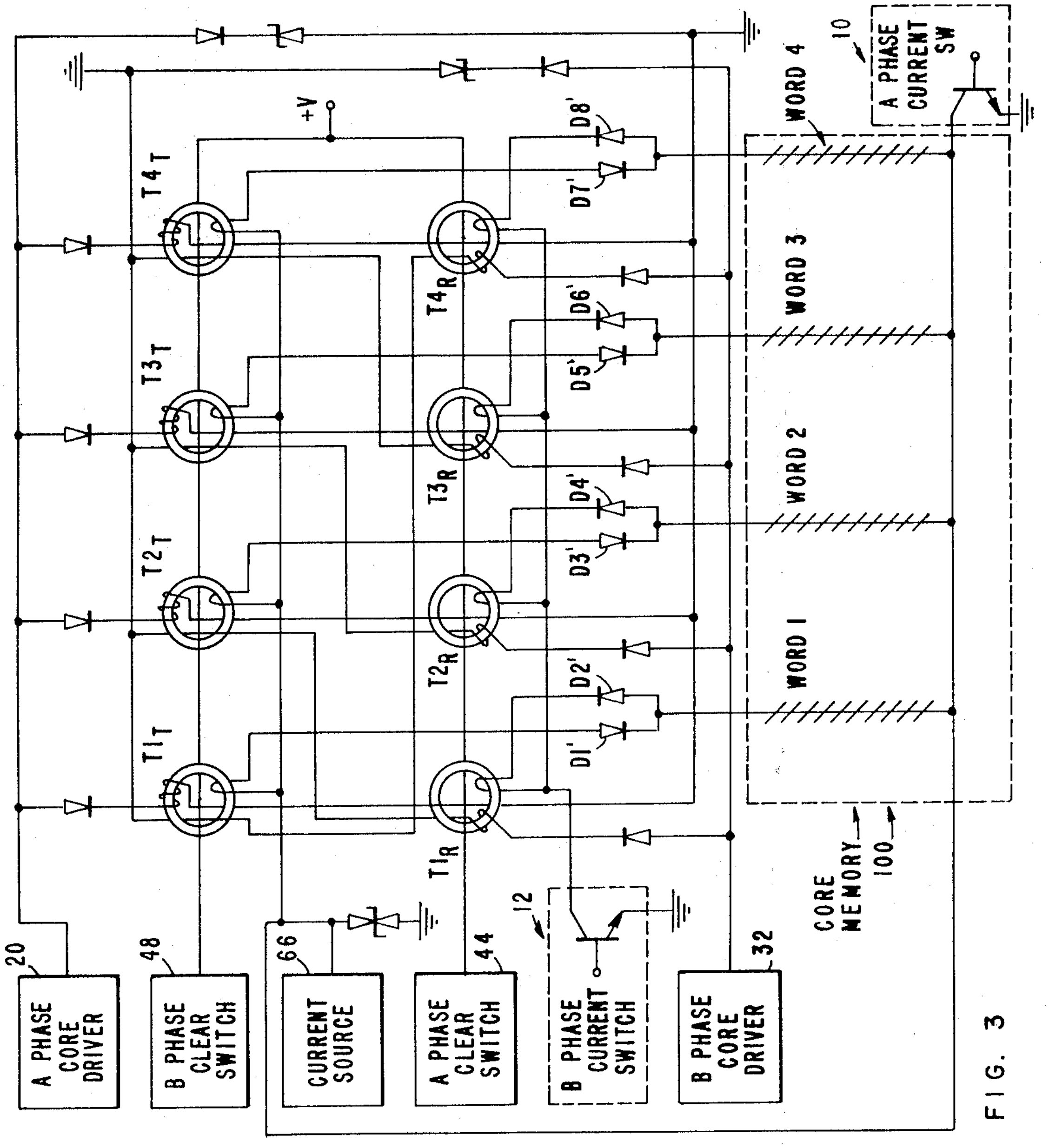
FIG. 3 is a schematic block diagram illustrating a second embodiment of the invention for supplying bidirectional load currents.

From what has been said with respect to FIG. 1, it will be recognized that the number of shift register cores required therein equals the number of loads through which it is desired to drive a unidirectional load current. In certain applications, it is desired to drive a bidirectional current through a load, as for example, in driving the select lines of a core memory. FIG. 3 illustrates an embodiment of the invention for driving bidirectional currents through the word lines of a word oriented core memory 100. It is emphasized however, that the techniques of the present invention finds utility in many other applications such as, for example, driving bidirectional currents through the half select lines of a more conventional coincident select core memory.

The embodiment of the invention illustrated in FIG. 3 is very similar to the embodiment illustrated in FIG. 1 except, however, that two shift register cores are provided for a single load. That is, the transmit core of a shift register stage is effectively utilized to permit current flow through a load coupled thereto in one direction while the receive core of the same stage is utilized to permit current flow through the load in an opposite direction. When the commutator of FIG. 3 is used in conjunction with a destructive read out memory 100, the A and B phases will be respectively utilized for effecting reading and writing in the memory.

Due to the similarity between the embodiments of FIGS. 1 and 3, attention will be primarily directed to the differences therebetween. Note that whereas the load diodes D1–D8 in FIG. 1 were all similarly oriented, in the embodiment of FIG. 3 the diodes D1′, D3′, D5′ and D7′, all connected to shift register stage transmit cores, are oriented to permit downward current flow (as illustrated) through the loads, i.e., the word lines of the core memory 100. On the other hand, the diodes D2′, D4′, D6′ and D8′, respectively coupled to the receive cores of the shift register stages, are oriented to permit the upward flow of current (as illustrated) through the loads.

In the operation of the embodiment of FIG. 3, again assume that transmit cores $T1_T$ stores a "1" and that all of the other transmit cores are in a reset state. The A phase clear switch 44 initially switches all of the receive cores to a reset state. The A phase core driver 20 then supplies a pulse to all of the A phase drive windings to thus switch cores $D2_T$, $D3_T$ and $D4_T$ to a set state to in turn respectively back-bias diodes D3′, D5′ and D7′. As a consequence, when the A phase current switch 10 of FIG. 3 is closed, the current from source 66 will be steered completely through diode D1′ and through word line 1. As previously described, as a consequence of the A phase drive pulse not switching core $T1_T$, it will switch core $T1_R$ to a set state. Thereafter, the B phase clear switch 48 will clear the transmit cores to a reset state and the B phase core driver will provide a second phase pulse which will result in diode D2′ being the only diode not back-biased. As a consequence, when the B phase current switch 12 is closed, the current source 66 will provide a controlled current which will be steered completely through diode D2′. As previously described, the B phase current pulse will switch the state of the receive core $T1_R$ to the core $T2_T$.

From the foregoing, it will be recognized that a commutator apparatus has been disclosed herein which enables a precisely controlled current to be successively steered through a plurality of loads. In the first embodiment of the invention illustrated in FIG. 1, only one shift register core per load is required to supply unidirectional load current. In the second embodiment of the invention illustrated in FIG. 3 two shift register cores per load are utilized to permit bidirectional current flow through the load. As previously noted, the controlled current provided to the load is merely steered through a path established as a consequence of either the A or B phase drive pulses and does not itself function to produce switching or establish current steering paths. As a consequence, embodiments of the present invention are particularly useful in applications requiring the utilization of highly precise load currents.

Although particular embodiments of the invention have been described and illustrated herein, it is recognized that modifications and variations may readily occur to those skilled in the art and, consequently, it is intended that the claims be interpreted to cover such modifications and equivalents.

What I claim:

1. A commutator useful for steering a controlled current successively through a plurality of loads, said commutator comprising:

- a plurality of ordered magnetic cores each capable of assuming set and reset states;
- means for applying a drive pulse to said magnetic cores tending to switch said magnetic cores to a set state;
- a plurality of series paths connected in parallel, each path including a unidirectional current conducting device;
- each of said plurality of paths also including a load winding each coupled to a different one of said magnetic cores and responsive to that core switching to a set state for applying a back-biasing signal to the unidirectional current conducting device connected in series therewith; each of said paths further including a load; and
- means for applying a controlled current in parallel to all of said series paths substantially coincident with the application of said drive pulse to said magnetic cores whereby said controlled current will be blocked from flowing through those series paths including a back-biased unidirectional current conducting device.

2. The commutator of claim 1 including means responsive to said drive pulse for shifting the set state of those magnetic cores previously in said set state to a succeeding magnetic core.

3. A commutator useful for steering a controlled current successively through a plurality of loads, said commutator comprising:

- a plurality of pairs of magnetic cores, each pair including first and second cores each capable of assuming set and reset states;
- a plurality of first phase windings each core coupling the first and second cores of a different one of said core pairs;
- a plurality of second phase windings each coupling the second core of a different one of said core pairs of the first core of a succeeding core pair;
- means for applying a first phase pulse to said first phase windings tending to switch all of said first cores to said set state and each of said second cores coupled to a first core previously in said set state to said set state;
- means for applying a second phase pulse to said second phase windings tending to switch all of said second cores to said set state and each of said first cores coupled to a second core previously in said set state to said set state;
- a plurality of first unidirectional current conducting devices each associated with a different one of said first cores;
- a plurality of second unidirectional current conducting devices each associated with a different one of said second cores;
- a plurality of first load winding means each responsive to a different one of said first cores switching to a set state for applying a back-biasing signal to the associated unidirectional current conducting device;
- a plurality of second load winding means each responsive to a different one of said second cores switching to a set state for applying a back-biasing signal to the associated unidirectional current conducting device; and
- means for applying a controlled current to said first load winding means substantially coincident with the application of said first phase pulse to said first phase windings and to said second load winding means substantially coincident with the application of said second phase pulse to said second phase windings.

4. The commutator of claim 3 wherein said first and second phase pulses are alternately applied to said first and second phase windings, respectively.

5. The commutator of claim 4 including means for resetting all of said second cores just prior to the application of said first phase pulse to said first phase windings and for resetting all of said first cores just prior to the application of said second phase pulse to said second phase windings.

6. The commutator of claim 3 wherein said plurality of loads are each respectively connected to a different one of said unidirectional current conducting devices.

7. The commutator of claim 3 wherein said plurality of loads is equal in number to said plurality of core pairs; and

- means connecting each of said loads to first and second unidirectional current conducting devices coupled to first and second cores of a common core pair for conducting current in opposite directions therethrough.

8. The commutator of claim 3 wherein said means for applying a controlled current to said load winding means includes means for regulating the voltages applied across said load winding means.